July 21, 1959  P. C. KURLYTIS  2,895,380
REAR VIEW MIRROR
Filed May 21, 1957  2 Sheets-Sheet 1
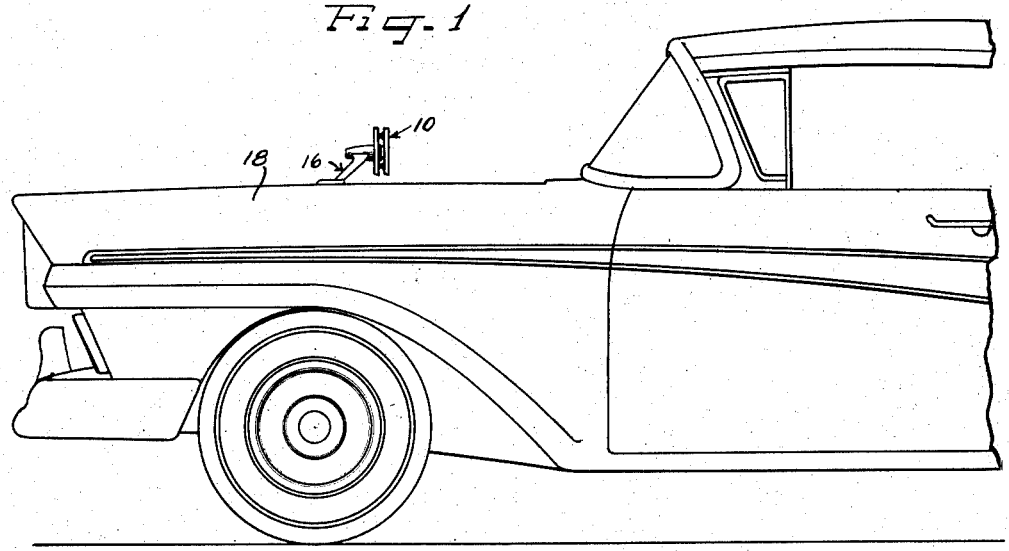
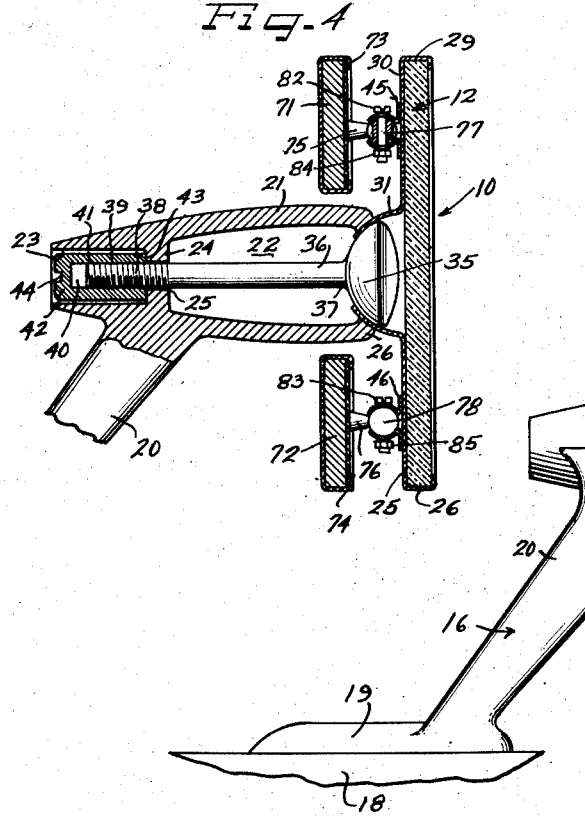
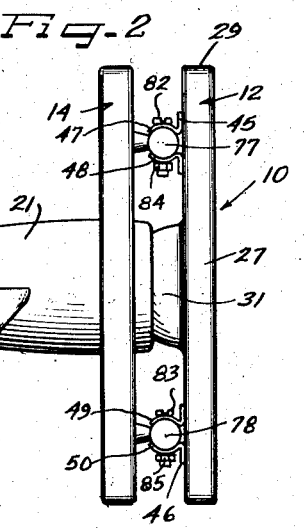
Inventor
PAUL C. KURLYTIS July 21, 1959 P. C. KURLYTIS 2,895,380
REAR VIEW MIRROR
Filed May 21, 1957 2 Sheets-Sheet 2
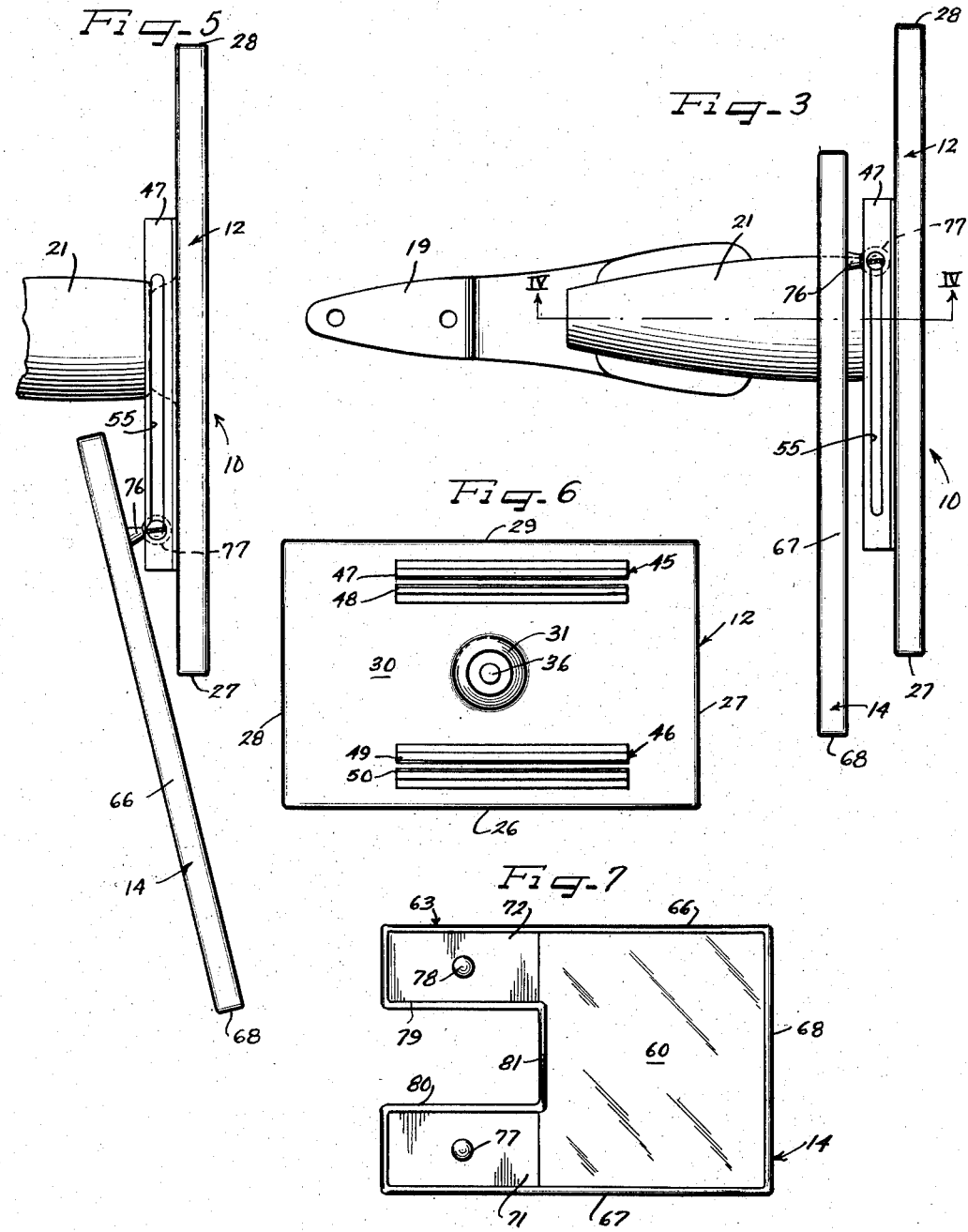
Inventor
PAUL C. KURLYTIS

United States Patent Office 2,895,380
Patented July 21, 1959

2,895,380

REAR VIEW MIRROR

Paul C. Kurlytis, Springfield, Ill.

Application May 21, 1957, Serial No. 660,515

1 Claim. (Cl. 88—86)

This invention relates to rear vision mirrors for use on automobiles and the like, and has special reference to an improved construction for a mirror having a plurality of separate and independent sections, the mirror applicable preferably to a fender of the automobile.

It is among the objects of the invention to provide a rear vision mirror assembly which has two independent adjustable sections which provide greatly improved driver vision to the rear of the automobile as well as along the driver's side of the car.

A further object of the invention is to provide a rear vision mirror assembly which includes at least two independent sections and an adjustable mounting for each section so that the mirror can be adjusted as an entirety to cover a desired field of vision, or two or more related fields of vision, the independent sections adjustably movable relative to each other to vary or increase the field of vision covered by the mirror assembly and including means for rigidly securing the two sections in adjusted positions relative to each other.

Another object of the invention is to provide a rear vision mirror of the above type which is neat in appearance, strong and durable in construction and one that is not expensive to manufacture.

Still another object of the invention is to provide strong and rigid means for securing the mirror assembly as a unit to the fender of the automobile, or to the front frame portions of the automobile, but with each section easily adjustable therewith.

The invention further consists in the novel construction, adaptation and combination of parts of a duplicate mirror for automobiles and the like, the advantages thereof will be readily apparent from the following description of preferred embodiments thereof, taken in conjunction with the accompanying drawings, in which:

Figure 1 is a fragmentary side elevation of an automobile with the mirror assembly attached to the fender thereof for use;

Figure 2 is an enlarged side elevation of the mirror assembly attached to a fragmentary portion of a fender;

Figure 3 is a top plan view of the mirror assembly shown in Fig. 2;

Figure 4 is a vertical section taken along the line IV—IV of Fig. 3;

Figure 5 is a top plan view of the mirror assembly shown in Fig. 3 with the auxiliary section thereof extended, and secured in its extreme outward position;

Figure 6 is a rear elevational view of the main mirror frame for supporting the main section of the mirror, the frame having a plurality of supporting channel members horizontally arranged and secured thereon; and Figure 7 is an inverted front elevational view of the auxiliary mirror frame embodying the auxiliary mirror, the mirror enclosing portions of the frame having a plurality of ball pins arranged and secured thereon.

Referring now more particularly to the accompanying drawing, the rear vision mirror assembly 10 includes an elongated flat main mirror 12, an auxiliary flat mirror 14, and support 16 for the mirror assembly. The support 16 is adapted to be secured to the automobile fender 18, as illustrated in Figs. 1 and 2.

The support is preferably of die cast construction and has a base portion 19, an upstanding arm 20 and streamlined body portion 21. The body portion 21 contains a hollow chamber 22 adjacent its forward end, a bore 23 at its rear end, and a vertical wall 24 between said chamber and said bore which embodies a central horizontal passage 25 therethrough. Said body portion 21 has a reduced forward end portion convex in shape with a central opening therein defining a stationary clamping jaw 26 for gripping extended means secured to the mirror frame, later to be described. The rear end of said body portion 21 is tapered to give a streamline effect for controlling the flow of air thereover.

The main mirror 12 is enclosed in a rectangular shaped frame 25 of channel formation. The base of the frame 26 will engage the bottom longitudinal edge of the mirror while in its normal substantially vertical position. The vertical uprights 27 and 28 of the frame formed integral with the outer ends of the base 26 will engage the vertical ends of the main mirror. The top of the frame 29, integral with the vertical uprights and formed integral therewith, will engage the upper longitudinal edge of the main mirror. The channel frame 25 embodies a rear wall portion 30 which is formed with a centrally disposed rearwardly projecting socket 31 within which a ball 35 is disposed. The ball 35 is carried by a stem 36 which may be disposed within the body portion 21 of the support 16. The forward end 37 of the stem is formed integral with said ball 35. The rear end 38 of the stem 36 extends through the aperture 25 of wall 24 and is threaded to receive a cylindrical adjusting member 39. Said member 39 comprises a central threaded bore 40 with side wall 41 and a closed end portion 42. The exterior rear surface of the end portion 42 is provided with a screwdriver slot 44. The forward vertical wall portion 43 of said adjusting member 39 is assembled in pressing contact with the vertical rear side of wall 24. In assembly, the ball 35 is disposed within the socket 31 and the exterior surface of said socket is pressed into locking engagement with the stationary jaw 26 whenever the stem 36 is drawn rearwardly within the body portion 21 of the support 16 by turning the adjusting member 39 in a clockwise direction. By loosening the adjusting member 39 upon the stem 36 it is apparent a quick adjustment of the main mirror may be effected.

The rear wall portion 30 of said main mirror frame further embodies a pair of longitudinally arranged channel members 45 and 46, suitably spaced parallel with the top and base portions of the frame and the mirror supported thereby. The rearwardly extending portions 47, 48, 49 and 50 of the pair of channel members 45 and 46, are so formed that the inner walls thereof form substantially two horizontal cylindrical chambers within each a cylindrical member or a spherical ball type member may be disposed. Said extending portions are each provided with a longitudinal slot, such as slot 55 shown in extension 47, by Fig. 5. Said slots permit a locking means to travel transversely of the channel member as will be described later.

The auxiliary mirror 14, clearly shown by Fig. 7, comprises a rectangular surface portion 60, usually made square for economical reasons. The mirror is supported in a bifurcated frame 63 having longitudinal horizontal leg portions 79 and 80, said frame designed to extend above and below the body portion 21 of the support 16 when assembled with the frame supporting the main mirror 12. Said frame 63 is of channel shape construction.

The mirror 14 is supported within the frame 63 by base portion 66, top portion 67 and one side portion 68. The frame 63 embodying the two rectangular leg sections 79 and 80 encloses two rectangular shaped blocks 71 and 72 made of wood or other suitable material. Said blocks 71 and 72 form suitable locking means to engage the remaining side of the mirror not contacted by the frame. Due to the space between the upper and lower sections 79 and 80, a portion 81 of the frame 63 surrounding the free edges of the blocks will also contact the free side of the mirror therebetween. Metal plates 73 and 74 are assembled over the exposed surfaces of said blocks 71 and 72 and rigidly clamped thereto by the channel shaped frame 63. Said metal plates 73 and 74 have centrally disposed studs 75 and 76 and on the ends of which are carried balls 77 and 78. Said balls each having a bore extending vertically therethrough to receive a pair of locking bolts 82 and 83 respectively. By adjusting the locking nuts 84 and 85, assembled upon the lower end of said bolts, the channel members 45 and 46 are rigidly clamped upon said balls 77 and 78 which will rigidly lock said auxiliary mirror 14 in a desired position for viewing by the driver of the automobile.

The mirror 14 may be slipped inwardly substantially behind mirror 12 as shown by Fig. 3, or extended outwardly as shown by Fig. 5, or twisted to any desired angle in order to cause the line of sight to extend along the side of the automobile and to the rear thereof by simply loosening the bolts, sliding and pivoting the mirror as desired, and again clamping the bolts and parts securely together in place.

Having the two mirrors 12 and 14 constructed and assembled as shown, the mirror 12 may be adjusted by moving the ball 35 clamped within socket 31 and locked in place by adjusting member 39, while the mirror 14 may be adjusted by moving the mirror secured with the balls, by moving the balls 77 and 78 along and within the channel members 45 and 46, and locking same in place by tightening the bolts and nuts 82 and 83 in place. When the two mirrors are suitably adjusted it will be found that the occupant in the left hand front seat of the automobile can see images of objects along the left hand side of the automobile and to the rear thereof, and particularly cars which are overtaking him and passing, that will be lost by only one mirror. The same mirror can be assembled on the right fender so the occupant in the right hand front seat of the automobile can have the same benefits on his side of the automobile.

This duplex type mirror is neat and ornamental in appearance, is not expensive to manufacture and is easily applied to an ordinary car, especially to the left or right front fender, and is especially useful in preventing accidents because it enables the driver in the front seat to see the road behind the car.

From the foregoing description, taken in connection with the accompanying drawings, the advantages of the construction and the methods of operation of the mirror unit will be readily understood by those skilled in the art to which the invention relates, and, while I have described the principle of operation of the invention, together with the device, which I now consider to be the best embodiment thereof, it will be understood that the device shown is merely illustrative and that various other changes may be made in form, details of construction and arrangement of the parts without departing from the spirit of the invention.

I claim as my invention:

In a multiple position rear view vehicular mirror, a support for attachment to a vehicle fender, a rectangular frame pivotally connected to said support, a rectangular mirror carried by said rectangular frame, a bifurcated shaped frame, a square mirror carried by the body portion of said bifurcated shaped frame, means supported by the leg portions of said bifurcated frame, a ball pin carried by the forward side of each of said means in said leg portions, a pair of channel members mounted horizontally on the rear of said rectangular frame, longitudinal slots provided in the upper and lower extending portions of said channel members, a vertical bore provided in each of the balls carried upon the free ends of the ball pins, said balls assembled within said channel members and locking bolts extending through said slots and said bores to secure said square mirror in position relative to said rectangular mirror.

References Cited in the file of this patent

UNITED STATES PATENTS

| | | |
|---|---|---|
| 2,582,651 | Peterson | Jan. 15, 1952 |
| 2,663,225 | Blan | Dec. 22, 1953 |